(12) United States Patent
Nakibly et al.

(10) Patent No.: US 11,836,103 B1
(45) Date of Patent: Dec. 5, 2023

(54) TRAFFIC SEPARATION IN A MULTI-CHIP SYSTEM

(71) Applicant: Amazon Technologies, Inc., Seattle, WA (US)

(72) Inventors: Guy Nakibly, Kedumim (IL); Roi Ben Haim, Netanya (IL); Erez Izenberg, Tel Aviv-Jaffa (IL); Adi Habusha, Alonei Abba (IL); Yaniv Shapira, Beit Yitshak Sha'ar Hefer (IL)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 17/455,138

(22) Filed: Nov. 16, 2021

(51) Int. Cl.
*G06F 13/40* (2006.01)
*G06F 13/42* (2006.01)

(52) U.S. Cl.
CPC ...... *G06F 13/4027* (2013.01); *G06F 13/4221* (2013.01); *G06F 2213/0026* (2013.01)

(58) Field of Classification Search
CPC ............. G06F 13/4027; G06F 13/4221; G06F 2213/0026
See application file for complete search history.

(56) References Cited

U.S. PATENT DOCUMENTS

| | | | |
|---|---|---|---|
| 7,047,372 B2 | 5/2006 | Zeitler et al. | |
| 9,842,075 B1* | 12/2017 | Davis | G06F 13/4295 |
| 2010/0318741 A1 | 12/2010 | Scott et al. | |
| 2013/0080667 A1 | 3/2013 | Saripalli | |
| 2016/0048347 A1 | 2/2016 | Rangarajan et al. | |
| 2019/0034363 A1 | 1/2019 | Palermo et al. | |
| 2019/0356611 A1* | 11/2019 | Das Sharma | H04L 47/527 |
| 2020/0192859 A1* | 6/2020 | Jones | G06F 13/404 |
| 2020/0358637 A1* | 11/2020 | Nakayama | H04L 12/462 |
| 2022/0197685 A1 | 6/2022 | Palermo et al. | |
| 2022/0206977 A1* | 6/2022 | Hu | G06F 13/28 |
| 2022/0318163 A1* | 10/2022 | Brewer | G06F 13/4027 |
| 2023/0041617 A1* | 2/2023 | Israel Vijayponraj | G06F 12/1027 |

OTHER PUBLICATIONS

U.S. Appl. No. 17/643,132, filed Dec. 7, 2021, Nakibly et al.
U.S. Non-Final Office Action dated May 25, 2023 in U.S. Appl. No. 17/643,132.

* cited by examiner

*Primary Examiner* — Nimesh G Patel
(74) *Attorney, Agent, or Firm* — Weaver Austin Villeneuve & Sampson LLP (57) ABSTRACT

Systems and methods are provided to differentiate different types of traffic going through the same physical channel such that the traffic flow for different traffic types does not impact each other. The physical channel can be configured to support a plurality of virtual channels. Each transaction that needs to be communicated through the physical channel can be classified into a certain traffic type, and each traffic type can be assigned to a virtual channel. Each transaction can be communicated on a respective virtual channel based on the corresponding traffic type. If the traffic flow through a first virtual channel for a transaction slows down, the traffic flow through a second virtual channel for another transaction can continue without getting impacted by the slow down on the first virtual channel.

17 Claims, 6 Drawing Sheets

IDENTIFY, BY A FIRST INTEGRATED CIRCUIT (IC), A FIRST TRANSACTION AND A SECOND TRANSACTION THAT ARE TARGETED TO A SECOND IC COUPLED TO THE FIRST IC VIA A PHYSICAL CHANNEL. THE PHYSICAL CHANNEL IS CONFIGURED TO SUPPORT A PLURALITY OF VIRTUAL CHANNELS FOR COMMUNICATION BETWEEN THE FIRST IC AND THE SECOND IC
502

↓

DETERMINE THAT THE FIRST TRANSACTION IS ASSOCIATED WITH A FIRST TRAFFIC TYPE FROM A PLURALITY OF TRAFFIC TYPES, AND THE SECOND TRANSACTION IS ASSOCIATED WITH A SECOND TRAFFIC TYPE FROM THE PLURALITY OF TRAFFIC TYPES. THE FIRST TRAFFIC TYPE IS ASSIGNED TO A FIRST VIRTUAL CHANNEL FROM THE PLURALITY OF VIRTUAL CHANNELS, AND THE SECOND TRAFFIC TYPE IS ASSIGNED TO A SECOND VIRTUAL CHANNEL FROM THE PLURALITY OF VIRTUAL CHANNELS
504

↓

COMMUNICATE, VIA THE PHYSICAL CHANNEL, THE FIRST TRANSACTION TARGETED TO THE SECOND IC ON THE FIRST VIRTUAL CHANNEL CORRESPONDING TO THE FIRST TRAFFIC TYPE ASSOCIATED WITH THE FIRST TRANSACTION, AND THE SECOND TRANSACTION TARGETED TO THE SECOND IC ON THE SECOND VIRTUAL CHANNEL CORRESPONDING TO THE SECOND TRAFFIC TYPE ASSOCIATED WITH THE SECOND TRANSACTION
506

TRAFFIC SEPARATION IN A MULTI-CHIP SYSTEM

BACKGROUND

A system-on-a-chip (SoC) is generally used to provide a reduced physical size, increased functionality, and lower costs by integrating one or more processor cores, memory, input/output (I/O) devices, coprocessors, and other components based on the system specification. Some systems may include multiple SoCs to support functionalities that demand high performance and compute power such as cloud computing, application hosting, machine learning, among others. Within a system, different SoCs can be configured with different functionalities to perform different types of tasks. As such, different types of traffic can be passed between the SoCs.

BRIEF DESCRIPTION OF THE DRAWINGS

Various embodiments in accordance with the present disclosure will be described with reference to the drawings, in which.

DETAILED DESCRIPTION

A multi-chip system may include a plurality of system-on-chips (SoCs) or other integrated circuits to support functionalities that demand high performance and compute power such as cloud computing, databases, application hosting, machine learning, among others. Generally, communication traffic (or simply "traffic") between two SoCs passes over a single physical channel between the SoCs. The traffic may include transactions among various components of the SoCs, e.g., CPUs, memory, coprocessors (e.g., accelerator engines, crypto engines, graphics processing units (GPUs), audio processors, etc.), and various input/output (I/O) devices, using different bus protocols, e.g., Peripheral Component Interconnect express (PCIe), Serial Advanced Technology Attachment (SATA), Universal Serial Bus (USB), Inter-Integrated Circuit (I2C), Serial Peripheral Interface (SPI), etc.

In some systems, each SoC may include a processor and a memory coupled to an interconnect. The interconnect on a first SoC may be coupled to the interconnect on a second SoC via a physical channel to enable communication between the SoCs. Generally, the same physical channel is shared by various components of the system to carry the communication traffic between the first SoC and the second SoC. For example, the traffic may include a transaction initiated by a processor on the first SoC that is targeted to the memory or an I/O device on the second SoC, and a transaction initiated by an I/O device on the first SoC that is targeted to the memory or another I/O device on the second SoC. In addition, there may be internal traffic for transactions among the components of the same SoC, e.g., a processor, memory, an I/O device, or a coprocessor of the SoC. Thus, at any given point in time, there may be different types of traffic going through the multi-chip system, which may include the internal traffic within each SoC, and the traffic between the SoCs.

Generally, traffic delays for certain transactions can impact other traffic flowing through the multi-chip system. In some instances, the traffic delays can occur when one of the target devices, or a PCIe port on the source or destination SoC cannot accept any more transactions. For example, a target device, or a PCIe port within an SoC may push back a PCIe transaction when the PCIe ordering rules are not being met, the local buffers are full, or for some other reason. The PCIe transactions generally adhere to certain ordering rules to avoid deadlocks. As an example, the ordering rules may include that a posted request cannot pass another posted request, completion of a non-posted request cannot pass a posted request, or a posted request can pass non-posted requests.

When there is push back for a transaction, the transaction data may be held back in a buffer either on the source device or elsewhere along the path to the target device. If the pushed back transaction is being communicated over the physical channel, all the traffic flowing through the physical channel may get impacted since the same physical channel is used for the various types of traffic between the SoCs. Furthermore, as the duration of the push back increases, the buffers that are holding the transactions can start to fill up, which can further slowdown or halt the traffic on the physical channel and degrade the system performance.

Embodiments can provide systems and methods to differentiate different types of traffic going through the same physical channel between the SoCs such that the traffic flow for different transactions does not interfere with each other. In some embodiments, the physical channel can be configured to support a plurality of virtual channels. Each transaction that needs to be communicated between the SoCs can be associated with a certain traffic type, and each traffic type can be assigned to a virtual channel from the plurality of virtual channels. Each transaction between the SoCs can be communicated over a respective virtual channel on the same physical channel based on the traffic type associated with the transaction.

In some embodiments, each transaction can be associated with a traffic type by separating the traffic for the PCIe transactions from the traffic for the non-PCIe transactions so that the traffic delays for the PCIe transactions do not impact the traffic flow for the non-PCIe transactions. As an example, a PCIe transaction (i.e., a transaction based on a PCIe protocol) can be associated with a PCIe traffic type, and a non-PCIe transaction can be associated with a non-PCIe traffic type. The PCIe transaction and the non-PCIe transaction can be communicated to the second SoC using a first virtual channel and a second virtual channel, respectively. If the traffic flow through the first virtual channel slows down due to push back from the target device or for another reason, the traffic flow through the second virtual channel can continue without getting impacted by the traffic delays on the first virtual channel.

Separating the traffic communicated between the SoCs into different traffic types can allow individual management of the traffic flow on different virtual channels, which can prevent the overall traffic flow between the SoCs from getting impacted. In some embodiments, the traffic flow on each virtual channel can be managed individually using separate buffers and credits for each traffic type. A traffic type and/or a virtual channel identifier (VCID) corresponding to each virtual channel can be communicated across the physical channel along with the transaction information, which can be used for routing the transactions to the appropriate targets. In some examples, the physical channel can use an Advanced eXtensible Interface (AXI) protocol for communication between the SoCs, and the traffic type and/or the VCID can be indicated in one or more AXI USER bits.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
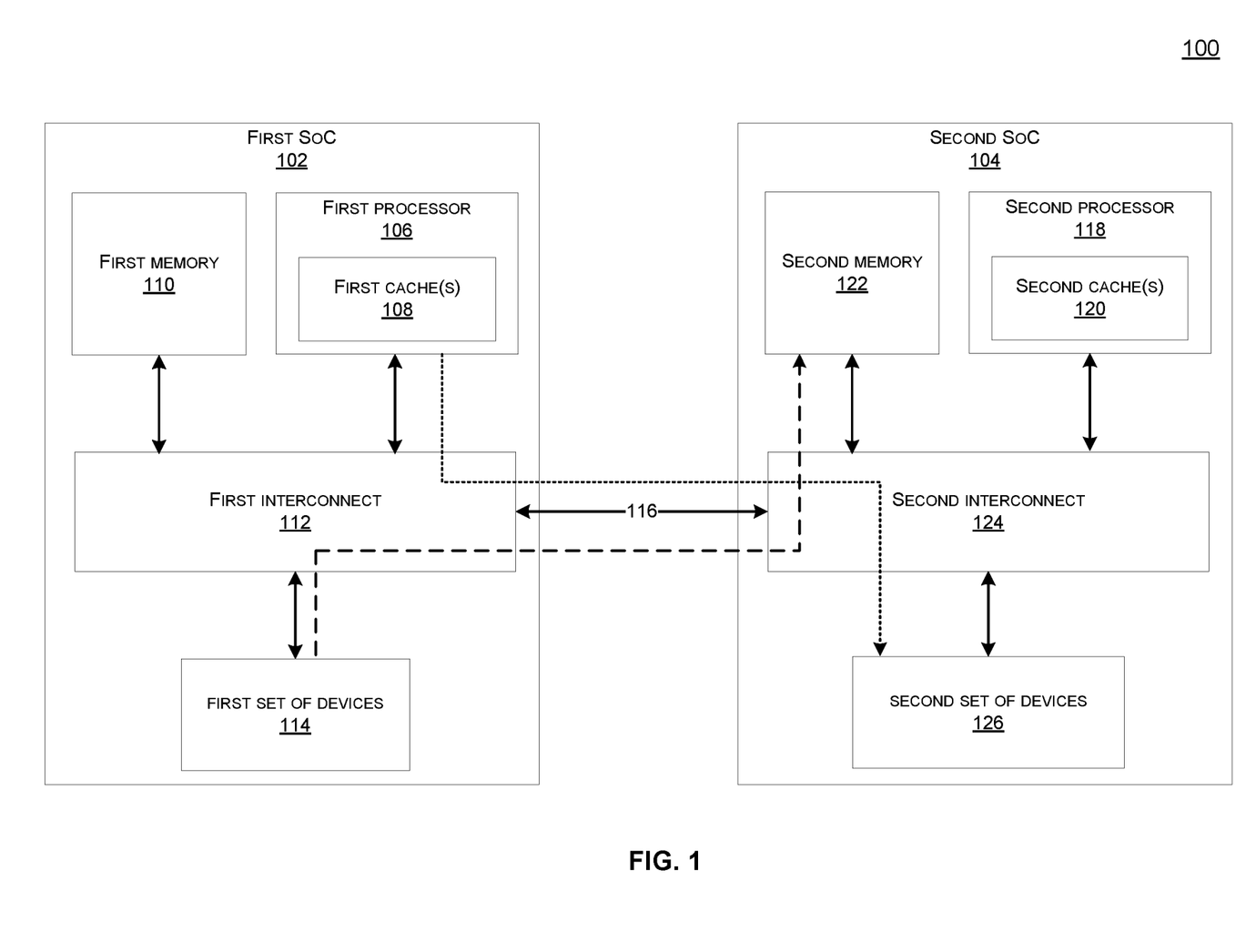
FIG. 1 illustrates a multi-chip system comprising a first SoC and a second SoC configured to communicate via a physical channel, according to some embodiments.

FIG. 1 illustrates a multi-chip system 100 comprising a first SoC 102 and a second SoC 104 configured to communicate via a physical channel 116, according to some embodiments.

The first SoC 102 may comprise a first processor 106 and a first memory 110 coupled to a first interconnect 112. The first processor 106 may comprise one or more first caches 108. In some examples, the first processor 106 may include multiple processor cores or CPUs, and the one or more first caches 108 may include a cache hierarchy for the first processor 106. The first memory 110 may include DRAMs, SRAMs, register files, flash, or other types of memory based on the implementation. The first SoC 102 may also include a first set of devices 114 coupled to the first interconnect 112. The first set of devices 114 may include different types of coprocessors and/or I/O devices. Some non-limiting examples of the first set of devices 114 may include acceleration engines, crypto engines, GPUs, audio processors, I/O controllers, network controllers, universal asynchronous receiver-transmitter (UART) devices, universal synchronous and asynchronous receiver-transmitter (USART) devices, SATA devices, USB devices, I2C devices, or SPI devices, among others.

Similarly, the second SoC 104 may comprise a second processor 118 and a second memory 122 coupled to a second interconnect 124. The second processor 118 may comprise one or more second caches 120. In some examples, the second processor 118 may include multiple processor cores or CPUs, and the one or more second caches 120 may include a cache hierarchy for the second processor 118. The second memory 122 may include DRAMs, SRAMs, register files, flash, or other types of memory based on the implementation. The second SoC 104 may also include a second set of devices 126 coupled to the second interconnect 124. The second set of devices 126 may include different types of coprocessors and/or I/O devices. Some non-limiting examples of the second set of devices 126 may include acceleration engines, crypto engines, GPUs, audio processors, I/O controllers, network controllers, UART devices, USART devices, SATA devices, USB devices, I2C devices, or SPI devices, among others.

Each of the first set of devices 114 and the second set of devices 126 may include one or more devices that support the PCIe protocol, and one or more devices that do not support the PCIe protocol. In this specification, a device that supports the PCIe protocol is termed as a PCIe device, and a device that does not support the PCIe protocol is termed as a non-PCIe device. Some non-limiting examples of a PCIe device may include a network controller, an acceleration engine, a crypto engine, an audio processor, etc. Note that the PCIe devices on each SoC can be configured to perform transactions with the local SoC as well as the remote SoC (e.g., across the physical channel). In some implementations, a PCIe device may include a PCIe port, a PCIe controller, a switch, a bridge, a hub, or other suitable components to provide a PCIe interface to an external device. For example, in some implementations, the PCIe interface may be used by a host device to configure the first SoC 102 and the second SoC 104, or to access the first memory 110 and the second memory 122. Alternatively, the PCIe interface may be used by some of the components (e.g., the coprocessors) of the first SoC 102 and/or the second SoC 104 to access an external device, e.g., host memory. Some non-limiting examples of the non-PCIe devices may include UARTs, USARTs, SATA devices, USB devices, I2C devices, or SPI devices, among others.

In most cases, all the transactions between the first SoC 102 and the second SoC 104 are communicated via the physical channel 116. As an example, the first processor 106 may initiate a first transaction to access a PCIe device (e.g., a network controller) on the second SoC 104, and an I/O device (e.g., an UART) on the first SoC 102 may initiate a second transaction to access the second memory 122. Thus, the first interconnect 112 may receive the first transaction from the first processor 106 to access the PCIe device in the second set of devices 126, and the second transaction from the I/O device in the first set of devices 114 to access the second memory 122. The first transaction and the second transaction can be communicated between the first SoC 102 and the second SoC 104 via the physical channel 116.

Generally, the transaction data may be stored in one or more buffers in the source device, the target device, or in the interconnects for communicating over the physical channel 116. In some examples, the first transaction and the second transaction may be stored in the first interconnect 112 or in the second interconnect 124. The first interconnect 112 and the second interconnect 124 may be implemented using meshes, rings, crossbars, nodes, switches, bridges, or other suitable components. In some implementations, the first interconnect 112 and the second interconnect 124 may support the Advanced Micro controller Bus Architecture (AMBA) Advanced eXtensible Interface (AXI) protocol, or AXI Coherency Protocol Extension (ACE) protocol for communication via the physical channel 116. The physical channel 116 can be a coherent communication channel, or a non-coherent communication channel.

In some implementations, the physical paths between the components of a SoC to the physical channel 116 within the SoC can also support virtualization to carry different types of traffic on different virtual channels. For example, the first processor 106, the first memory 110, and/or one or more of the first set of devices 114 may have one or more physical paths to the physical channel 116 via the first interconnect 112 within the SoC 102, and the one or more physical paths within the SoC 102 can include virtualized channels. Similarly, the second processor 118, the second memory 122, and/or one or more of the second set of devices 126 may have one or more physical paths to the physical channel 116 via the second interconnect 124 within the SoC 104, and the one or more physical paths within the SoC 104 can include virtualized channels. In some implementations, each of the first interconnect 112 and the second interconnect 124 may include an arbiter to provide the components coupled to the interconnect access to the physical channel 116 based on a suitable arbitration scheme. For example, the arbiter may prioritize requests to transmit data on the physical channel 116, and the arbiter may determine which sequence of data to provide to the physical channel 116.

In some instances, the first transaction from the first processor 106 may not be accepted by the PCIe device (e.g., the target device or the PCIe port). For example, the PCIe device may push back the first transaction if the PCIe ordering rules are not met, or the buffers for the PCIe device are full and cannot accept the first transaction. In such cases, the first transaction data may be held in one of the buffers in the first interconnect 112, or in the second interconnect 124 until the PCIe device is ready to accept the first transaction. If the push back duration is long and as the new transactions are issued, the buffers holding the transactions can start to fill up which can impact the traffic flow on the physical channel 116. Thus, the traffic delays for the first transaction may interfere with the traffic for the second transaction being communicated over the physical channel 116, which can degrade the system performance.

In some embodiments, each transaction between the first SoC 102 and the second SoC 104 can be identified and associated with a certain traffic type. For example, the first transaction can be associated with a PCIe traffic type, and the second transaction can be associated with a non-PCIe traffic type. The PCIe traffic type can represent a traffic type for transactions that are based on a PCIe protocol, and the non-PCIe traffic type can represent a traffic type for the transactions are not based on the PCIe protocol. In various examples, each transaction can be associated with a traffic type from a plurality of traffic types based on the information associated with the transaction such as type of the source device, type of the target device, data associated with the transaction, target address, transaction address, transaction type (e.g., read, write, response, configuration, interrupts, etc.), or transaction size, among others. Note that some examples are described using PCIe type or non-PCIe type transactions, but it will be understood that the embodiments can be used for traffic separation for other types of traffic without deviating from the scope of the disclosure.

In some embodiments, the physical channel 116 can be configured to support a plurality of virtual channels for communication between the first SoC 102 and the second SoC 104. Each traffic type can be assigned to a respective virtual channel from the plurality of virtual channels. In some embodiments, each physical path through the interconnect can support one or more virtual channels from the plurality of virtual channels. For example, each source device can be configured to determine a traffic type for the transaction and issue the transaction over a corresponding virtual channel through the physical path in the interconnect. Thus, the first transaction can be directed to a first virtual channel from the plurality of virtual channels, and the second transaction can be directed to a second virtual channel from the plurality of virtual channels. This is further explained with reference to FIG. 2.

Figure 2:
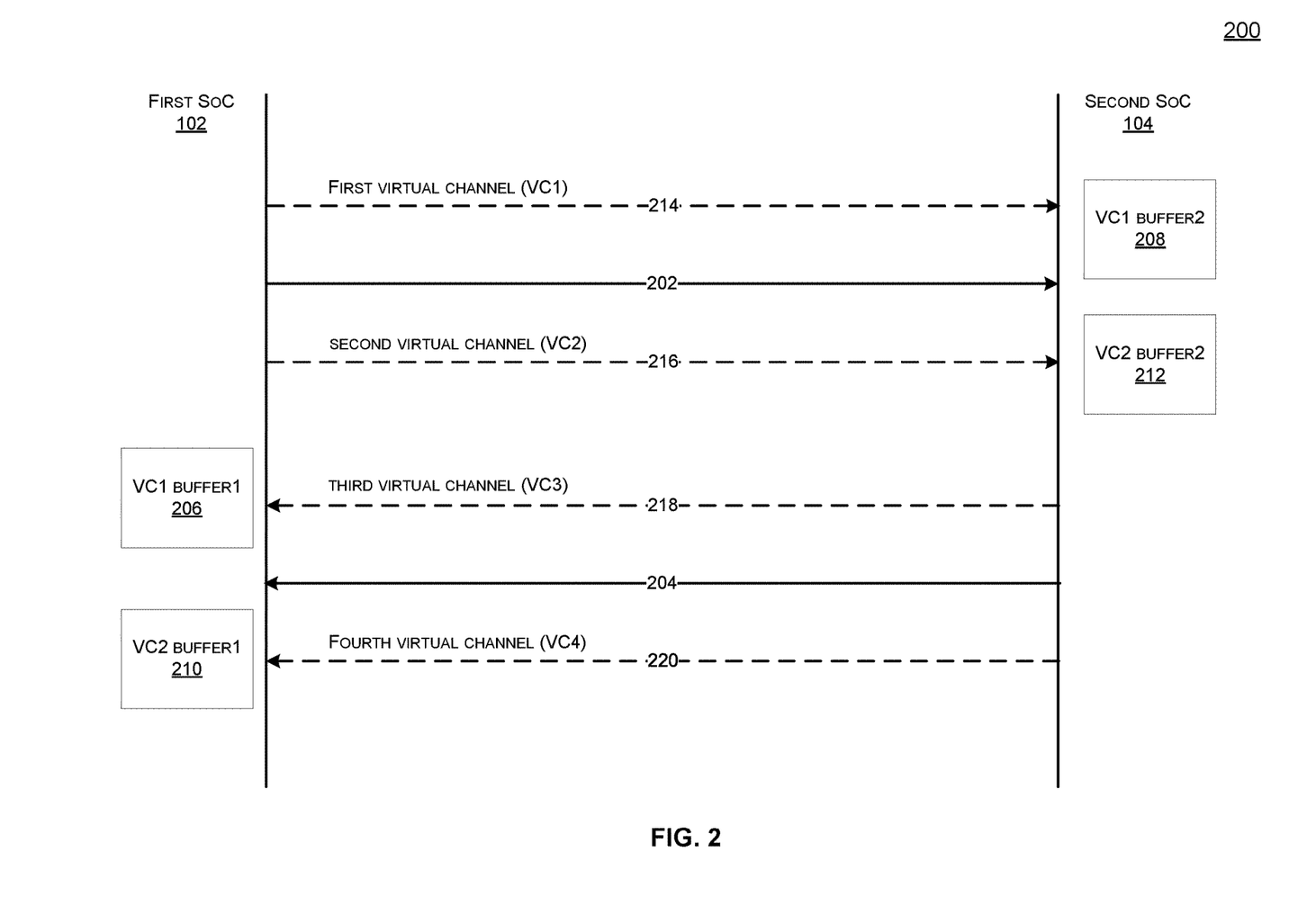
FIG. 2 illustrates an apparatus that can be used to support implementation of virtual channels between the first SoC and the second SoC over physical channels, according to certain embodiments.

FIG. 2 illustrates an apparatus 200 that can be used to support implementation of the virtual channels between the first SoC 102 and the second SoC 104 over physical channels, according to certain embodiments.

In some implementations, the physical channel 116 between the first SoC 102 and the second SoC 104 may include a respective physical channel for each direction of the traffic. As shown in FIG. 2, a physical channel 202 can be used to transmit the traffic from the second SoC 104 to the first SoC 102, and a physical channel 204 can be used to transmit the traffic from the first SoC 102 to the second SoC 104. The physical channel 202 can be configured to support a plurality of virtual channels comprising a first virtual channel (VC1) 214 and a second virtual channel (VC2) 216. The physical channel 204 can be configured to support a plurality of virtual channels comprising a third virtual channel (VC3) 218 and a fourth virtual channel (VC4) 220. Each SoC can utilize separate buffers on the receiver side to differentiate between different traffic for different transactions. For example, the first SoC 102 can utilize a VC1 buffer1 206 for the traffic received on the VC3 218, and a VC2 buffer1 210 for the traffic received on the VC4 220. The second SoC 104 can utilize a VC1 buffer2 208 for the traffic received on the VC1 214 and a VC2 buffer2 212 for the traffic received on the VC2 216.

As an example, the first processor 106 may determine that the first transaction is associated with a first traffic type (e.g., PCIe traffic type) based on an address of the target device, the transaction type, or any other information associated with the first transaction, and transmit the first transaction on a virtual channel through the first interconnect 112. The first interconnect 112 may receive the first transaction and direct the traffic to the VC1 214 over the physical channel 202. The second SoC 104 may store the first transaction in the VC1 buffer2 208 corresponding the first traffic type. Similarly, the I/O device from the first set of devices 114 may determine that the second transaction is associated with a second traffic type (e.g., non-PCIe traffic type) based on an address of the second memory 122, the transaction type, or any other information associated with the second transaction, and transmit the second transaction on another virtual channel through the first interconnect 112. The first interconnect 112 may receive the second transaction and direct the traffic to the VC2 216 over the physical channel 202. The second SoC 104 may store the second transaction in the VC2 buffer2 212 corresponding the second traffic type.

Similarly, the traffic received by the first SoC 102 from the second SoC 104 over the VC3 218 can be stored in the VC1 buffer1 206, and the traffic received by the first SoC 102 from the second SoC 104 over the VC4 220 can be stored in the VC2 buffer1 210. In some implementations, the VC1 buffer1 206 and the VC1 buffer2 208 can be part of the first interconnect 112, and the VC2 buffer1 210 and the VC2 buffer2 212 can be part of the second interconnect 124. However, other implementations are possible without deviating from the scope of the disclosure. In some examples, the PCIe traffic type may be assigned to the VC1 214 and the non-PCIe traffic type may be assigned to the VC2 216. Thus, the first SoC 102 may communicate the first transaction with the second SoC 104 on the VC1 214, and the second transaction with the second SoC 104 on the VC2 216.

The information associated with the traffic type can be passed between the SoCs to individually manage the traffic flow for each transaction. In some implementations, each virtual channel can be represented by a virtual channel identifier (VCID), which can be associated with the corresponding traffic type. As an example, the VCID and/or the traffic type can be communicated between the SoCs along with the transaction information. In some embodiments, the traffic type associated with each transaction can be indicated in one or more AXI USER bits within the SoC, and can be mapped to a corresponding VCID for communicating between the SoCs along with the transaction traffic.

In some embodiments, the traffic flow between the first SoC 102 and the second SoC 104 can be managed using separate credits for each of the VC buffers. Separate credits may be assigned to the VC1 buffer1 206, VC1 buffer2 208, VC2 buffer1 210 and the VC2 buffer2 212 either at reset or by configuration. Each buffer can keep track of their credits as the transaction data moves through the virtual channels. As the traffic flows on different virtual channels, corresponding credits can be decremented or incremented to manage the traffic flow on each virtual channel without impacting the traffic flow on other channels. As an example, when the VC1 buffer2 208 sends out a transaction to a target device on the second SoC 104, the VC1 buffer2 208 can send a credit message to the first SoC 102 indicating that it has released one of the credits. The transmitter side on the first SoC 102 can keep a count of the available credits and can send a transaction on the VC1 214 when the credit count is non-zero. In some implementations, the credit message may include the appropriate VCID value.

In some instances, when there is a pushback for the PCIe traffic type, the credit for the first transaction may end since the VC1 buffer2 208 may not accept the first transaction and the traffic on the VC1 214 may halt. However, in this case, the traffic for the second transaction can continue to flow through the VC2 216 without getting interrupted from the traffic delays on the VC1 214 related to the first transaction. At a later point in time, when the pushback for the PCIe traffic type is over, the traffic on the VC1 214 can restart without interrupting the traffic on the VC2 216.

Thus, the techniques described herein can be used to minimize the impact of different traffic types (e.g., PCIe traffic type, non-PCIe traffic type) on each other by separating the traffic for different types of transactions, and directing the different traffic types to different virtual channels over the same physical channel. In some implementations, each of the first interconnect 112 and the second interconnect 124 may include a coherent interconnect and a non-coherent interconnect, as described with reference to FIG. 3.

Figure 3:
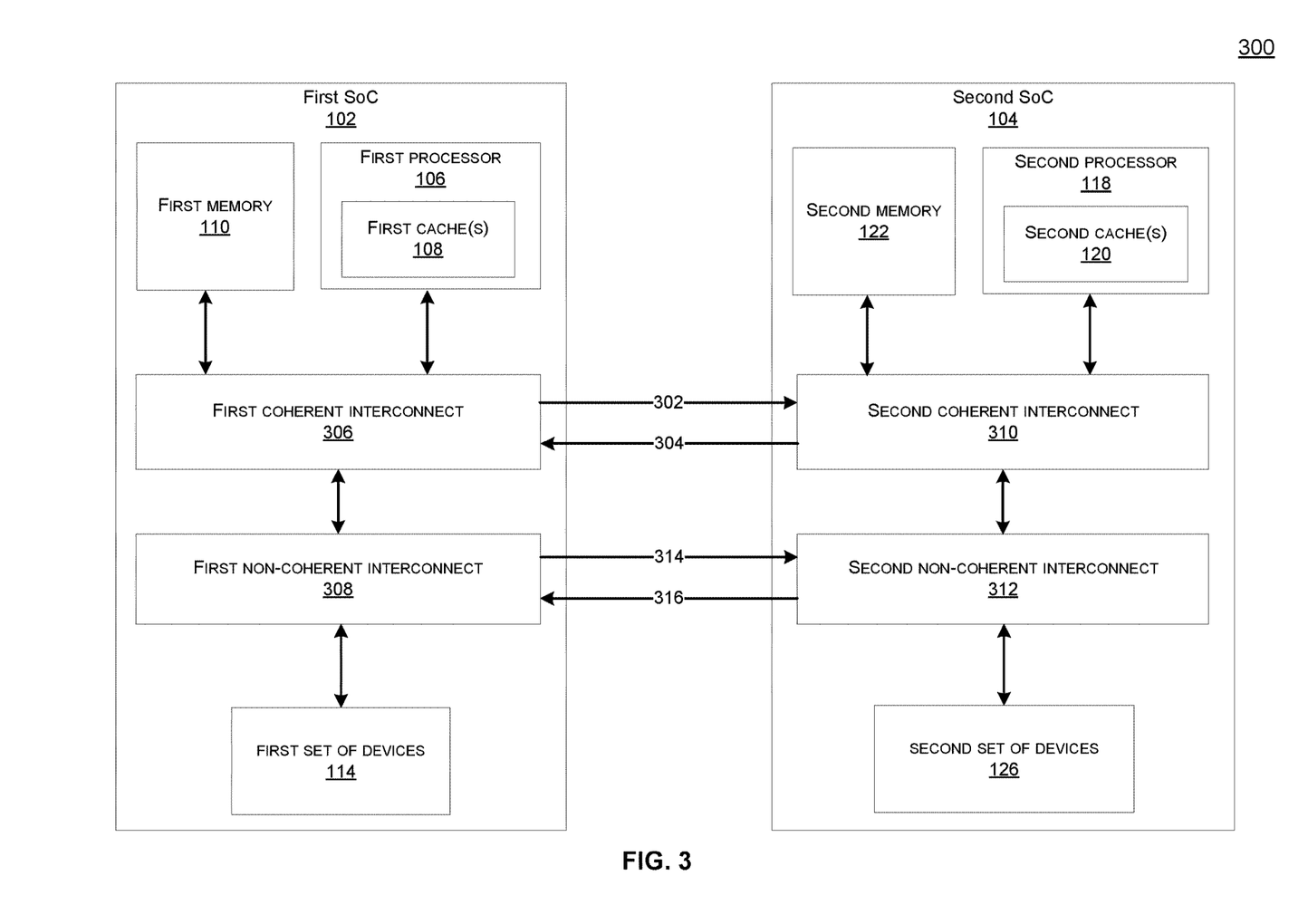
FIG. 3 illustrates a multi-chip system with multiple physical channels between the first SoC and the second SoC, according to certain embodiments.

FIG. 3 illustrates a multi-chip system 300 with multiple physical channels between the first SoC 102 and the second SoC 104, according to certain embodiments.

In some implementations, the first interconnect 112 in FIG. 1 may comprise a first coherent interconnect 306 coupled to a first non-coherent interconnect 308, and the second interconnect 124 in FIG. 1 may comprise a second coherent interconnect 310 coupled to a second non-coherent interconnect 312. The first coherent interconnect 306 may be configured to maintain coherency between the first memory 110 and the first caches 108, and the second coherent interconnect 310 may be configured to maintain coherency between the second memory 122 and the second caches 120. A first physical channel 302 and a second physical channel 304 between the first coherent interconnect 306 and the second coherent interconnect 310 can provide a coherent communication channel between the first SoC 102 and the second SoC to ensure that each processor on the first SoC 102 and the second SoC 104 operates on the most up-to-date data irrespective of where the data resides (e.g., the first memory 110, first caches 108, second memory 122, or the second caches 120).

In some embodiments, a third physical channel 314 and a fourth physical channel 316 between the first non-coherent interconnect 308 and the second non-coherent interconnect 312 can provide a non-coherent communication channel between the first SoC 102 and the second SoC. The third physical channel 314 and the fourth physical channel 316 can be used for the I/O traffic between the first SoC 102 and the second SoC 104, so that the first physical channel 302 and the second physical channel 304 can be used mainly for the CPU to CPU traffic, and the I/O traffic does not have to face coherency related delays associated with the CPU traffic.

In different embodiments, the first physical channel 302, the second physical channel 304, the third physical channel 314, and/or the fourth physical channel 316 can be configured to support virtual channels corresponding to different traffic types. For example, the first physical channel 302 and/or the third physical channel 314 can be configured to support the VC1 214 corresponding to the PCIe traffic type for the first transaction and the VC2 216 corresponding to the non-PCIe traffic type for the second transaction, respectively. In some implementations, the third physical channel 314 or the fourth physical channel 316 (non-coherent communication channel) can be virtualized to support PCIe and non-PCIe traffic, and the first physical channel 302 and the second physical channel 304 can support other types of traffic using virtualized or non-virtualized channels. In some implementations, the first physical channel 302 and the second physical channel 304 (coherent communication channel) can be virtualized to support PCIe and non-PCIe traffic, and the third physical channel 314 and the fourth physical channel 316 can support other types of traffic using virtualized or non-virtualized channels. In some implementations, all the physical channels 302, 304, 314 and 316 can be virtualized to support PCIe and non-PCIe traffic as well as other types of traffic.

Figure 4:
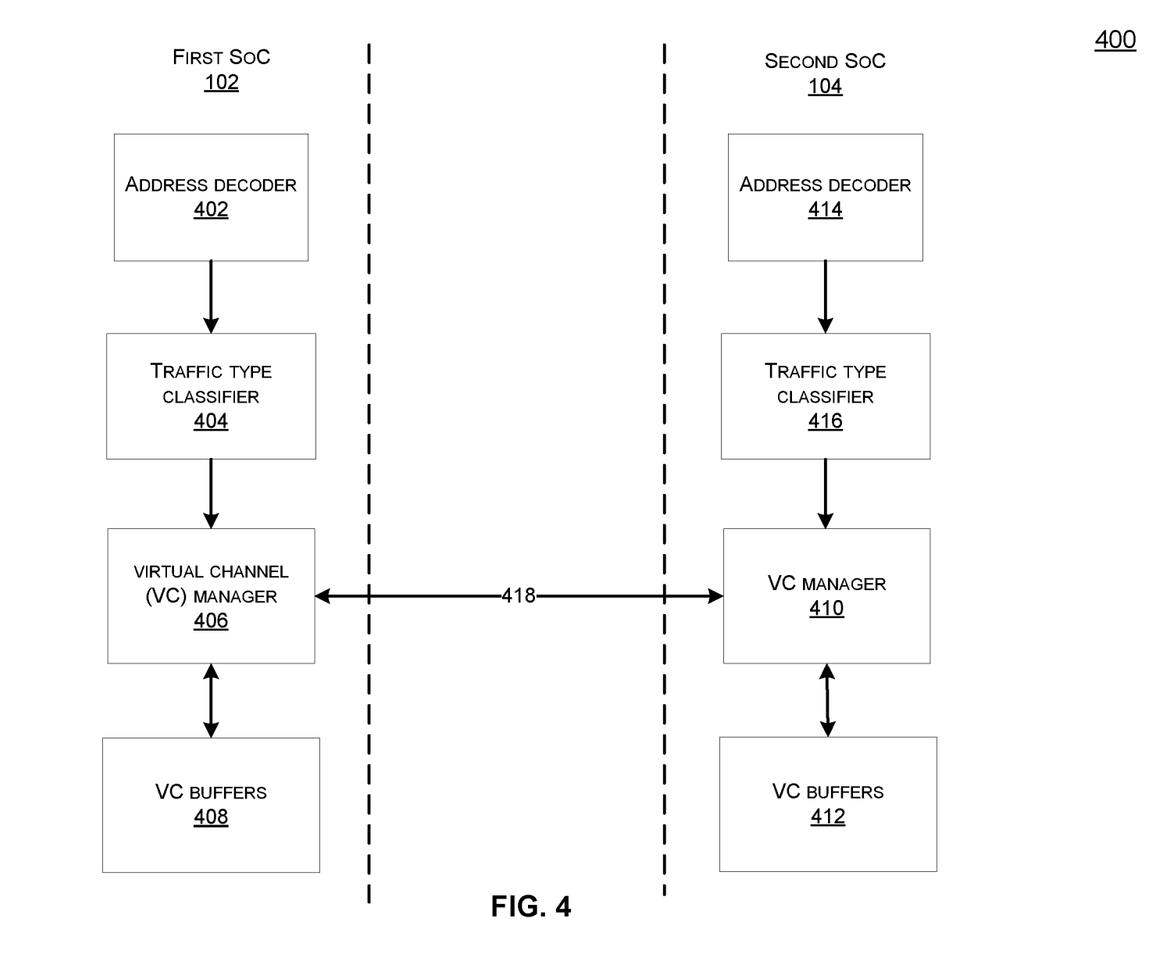
FIG. 4 illustrates an apparatus that can be used to support virtual channels on a physical channel, according to certain embodiments.

FIG. 4 illustrates an apparatus 400 that can be used to support multiple virtual channels on a physical channel 418, according to certain embodiments. In some examples, the physical channel 418 can include the physical channels 202 and 204, the first physical channel 302 and the second physical channel 304, or the third physical channel 314 and the fourth physical channel 316. In some examples, the physical channel 418 can be a physical path through an interconnect (e.g., the first interconnect 112 or the second interconnect 124), which can support multiple virtual channels to communicate the transactions from a source device to the physical channel 116.

Each SoC may comprise an address decoder, a traffic type classifier, a virtual channel manager, and virtual channel buffers to support a plurality of virtual channels on the physical channel 418. As shown in FIG. 4, the first SoC 102 may comprise an address decoder 402, a traffic type classifier 404, a virtual channel (VC) manager 406, and VC buffers 408, and the second SoC 104 may comprise an address decoder 414, a traffic type classifier 416, a VC manager 410, and VC buffers 412. One or more of the address decoder 402, traffic type classifier 404, VC manager 406, and the VC buffers 408 can be part of the first interconnect 112, and one or more of the address decoder 414, traffic type classifier 416, VC manager 410, and the VC buffers 412 can be part of the second interconnect 124.

The address decoder 402 may be configured to decode the target address of each transaction to identify the transactions that are targeted to the second SoC 104. In some implementations, the address decoder 402 may be part of the first interconnect 112, and identify the transactions received by the first interconnect 112. As an example, the address decoder 402 may decode the target address of the first transaction to determine that the first transaction is targeted to the second SoC 104, and the target address of the second transaction to determine that the second transaction is also targeted to the second SoC 104. The address decoder 414 may be configured to decode the target address of each transaction to identify the transactions that are targeted to the first SoC 102. For example, the address decoder 414 may be part of the second interconnect 124, and identify the transactions received by the second interconnect 124.

The traffic type classifier 406 may be configured to determine a traffic type associated with each transaction from a plurality of traffic types based on an address, a transaction type, and/or other information associated with the transaction. The address associated with the transaction may include a source address, a target address, or the transaction address. For example, the traffic type classifier 406 may classify the first transaction to a first traffic type based on a target address associated with the first transaction, and may classify the second transaction to a second traffic type based on a target address associated with the second transaction. Similarly, the traffic type classifier 416 may be configured to determine a traffic type associated with each transaction received by the second SoC 104 based on a target address associated with the transaction. In some embodiments, the traffic type classifier 406 may be part of each source device in the first SoC 102 that issues a transaction to the second SoC 104 so that the transaction traffic can be communicated over a corresponding virtual channel via a dedicated physical path in the first interconnect 112. Similarly, the traffic type classifier 416 may be part of each source device in the second SoC 104 that issues a transaction to the first SoC 102 so that the transaction traffic can be communicated over a corresponding virtual channel via a dedicated physical path in the second interconnect 124.

The VC manager 406 and the VC manager 410 may be configured to manage the plurality of virtual channels on the physical channel 418 using the VC buffers 408 and the VC buffers 412, respectively. The VC buffers 408 and the VC buffers 412 may include separate buffers and can be assigned separate credits. For example, the VC buffers 408 may include the VC1 buffer1 206 and the VC2 buffer1 210, and the VC buffers 412 may include the VC1 buffer2 208 and the VC2 buffer2 212, as discussed with reference to FIG. 2.

In some examples, the VC manager 406 may communicate the VCID corresponding to the first traffic type for the first transaction along with the first transaction data to the VC manager 410 to manage the traffic flow on the VC1 214, and the VCID corresponding to the second traffic type for the second transaction along with the second transaction data to the VC manager 410 to manage the traffic flow on the VC2 216. In some examples, the VC manager 406 may map the AXI USER bits to corresponding VCID values for the first traffic type and for the second traffic type.

The VC manager 410 may retrieve the VCID value from the transaction data, and direct the first transaction to the VC1 buffer2 208 corresponding to the first traffic type. The first transaction can be further directed to the PCI device in the second set of devices 126 via the second interconnect 124. Similarly, the VC manager 410 may retrieve the VCID value from the transaction data, and direct the second transaction to the VC2 buffer2 212 corresponding to the second traffic type. The second transaction can be further directed to the second memory 122 via the second interconnect 124. Referring back to FIG. 3, if the second interconnect 124 includes the second coherent interconnect 310 and the second non-coherent interconnect 312, the first transaction can be directed to the second set of devices 126 via the second non-coherent interconnect 312, and the second transaction can be directed to the second memory 122 via the second non-coherent interconnect 312 and the second coherent interconnect 310.

The VC manager 406 and the VC manager 410 may be further configured to halt the traffic on a virtual channel associated with a certain traffic type. For example, the VC manager 406 may receive an indication from the VC manager 410 to halt the traffic for the transactions associated with the first traffic type (e.g., due to push back from the PCIe device). In some implementations, the VC manager 410 may not release any credits to the VC manager 406 for communicating the transactions associated with the first traffic type, which can be an indication that the transactions associated with the first traffic type are to be halted. Based on the indication, the VC manager 406 can halt the traffic on the VC1 214 without interrupting the traffic on the VC2 216.

At a later point in time, the VC manager 410 may release the credits to the VC manager 406 for communicating the transactions associated with the first traffic type (e.g., the PCIe device can now accept the first transaction) indicating to the VC manager 406 to restart the traffic on the VC1 214. The VC manager 406 can restart the traffic flow on the VC1 214 upon receiving the indication without interrupting the traffic on the VC2 216.

Figure 5:
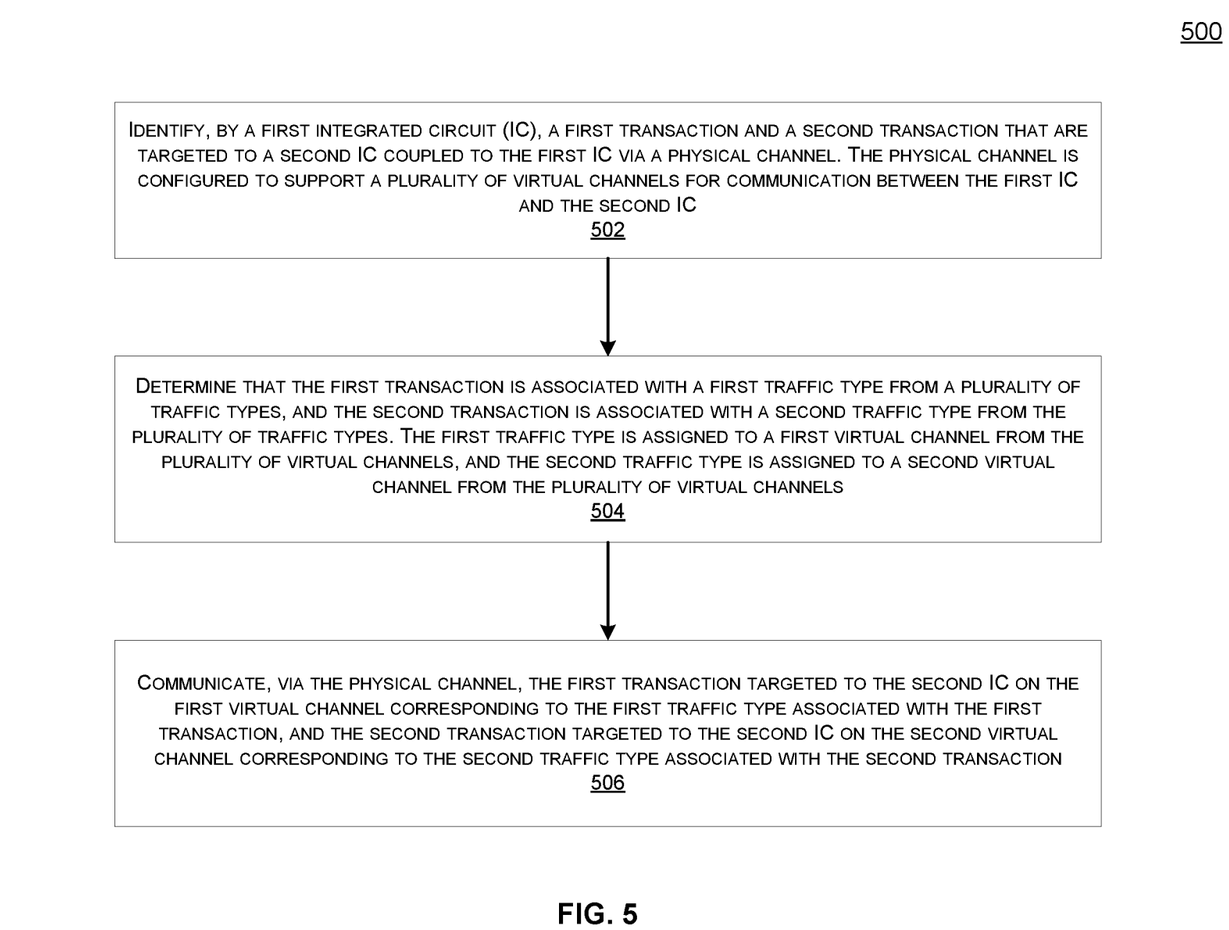
FIG. 5 illustrates a flow chart for a method performed by a first integrated circuit (IC) to communicate transactions with a second IC, according to some embodiments.

FIG. 5 illustrates a flow chart 500 for a method performed by a first IC to communicate transactions with a second IC, according to some embodiments. As an example, the first IC may include the first SoC 102 and the second IC may include the second SoC 104.

In step 502, the method includes identifying a first transaction and a second transaction that are targeted to the second IC coupled to the first IC via a physical channel. The physical channel may be configured to support a plurality of virtual channels for communication between the first IC and the second IC. As an example, the address decoder 402 in the first SoC 102 may identify a first transaction initiated by the first processor 106 that is targeted to a PCIe device on the second SoC 104, and a second transaction initiated by an I/O device on the first SoC 102 that is targeted to the second memory 122 on the second SoC 104. For example, the PCIe device may include a network controller device from the second set of devices 126, and the I/O device may include a UART device from the first set of devices 114. The physical channel 116 between the first SoC 102 and the second SoC 104 may be configured to support a plurality of virtual channels.

In step 504, the method includes determining that the first transaction is associated with a first traffic type from a plurality of traffic types and the second transaction is associated with a second traffic type from the plurality of traffic types. The first traffic type may be assigned to a first virtual channel from the plurality of virtual channels, and the second traffic type may be assigned to a second virtual channel from the plurality of virtual channels. The traffic type classifier 404 in the first SoC 104 may determine that the first transaction is associated with a PCIe traffic type based on the address associated with the first transaction, and the second transaction is associated with a non-PCIe traffic type based on the address associated with the second transaction. For example, the address associated with the first transaction may include an address for the PCIe device, and the address associated with the second transaction may include an address for the second memory 122. The PCIe traffic type may be assigned to the VC1 214 and the non-PCIe traffic type may be assigned to the VC2 216.

In step 506, the method includes communicating, via the physical channel, the first transaction targeted to the second IC on the first virtual channel corresponding to the first traffic type associated with the first transaction, and the second transaction targeted to the second IC on the second virtual channel corresponding to the second traffic type associated with the second transaction. The VC manager 406 may manage the traffic flow on the VC1 214 using corresponding credits from the VC1 buffer2 208, and on the VC2 216 using corresponding credits from the VC2 buffer2 212. For example, the VC manager 406 may communicate the VCID corresponding to the PCIe traffic type for the first transaction along with the first transaction data to the VC manager 410. The VC manager 410 may retrieve the VCID for the PCIe traffic type, and direct the first transaction to the VC1 buffer2 208 corresponding to the PCIe traffic type. Similarly, the VC manager 410 may retrieve the VCID for the non-PCIe traffic type, and direct the second transaction to the VC2 buffer2 212 corresponding to the non-PCIe traffic type. The first transaction and the second transaction can be directed to the second set of devices 126 and the second memory 122, respectively, by the second interconnect 124.

In some examples, when the PCIe device cannot accept the first transaction, the VC manager 406 may receive an indication from the VC manager 410 to halt the traffic for the first transaction associated with the PCIe traffic type. The VC manager 406 may halt the traffic on the VC1 214 without interrupting the traffic on the VC2 216 that is associated with the non-PCIe traffic type. At a later point in time, when the PCIe device is able to accept the first transaction, the VC manager 406 may receive another indication from the VC manager 410 to restart the traffic for the first transaction associated with the PCIe traffic type. The VC manager 406 can restart the traffic on the VC1 214 without interrupting the traffic on the VC2 216. Thus, the embodiments can be used to manage traffic flow on each virtual channel based on different traffic types so that the traffic delays on one virtual channel does not impact the traffic flow on the other virtual channels.

Figure 6:
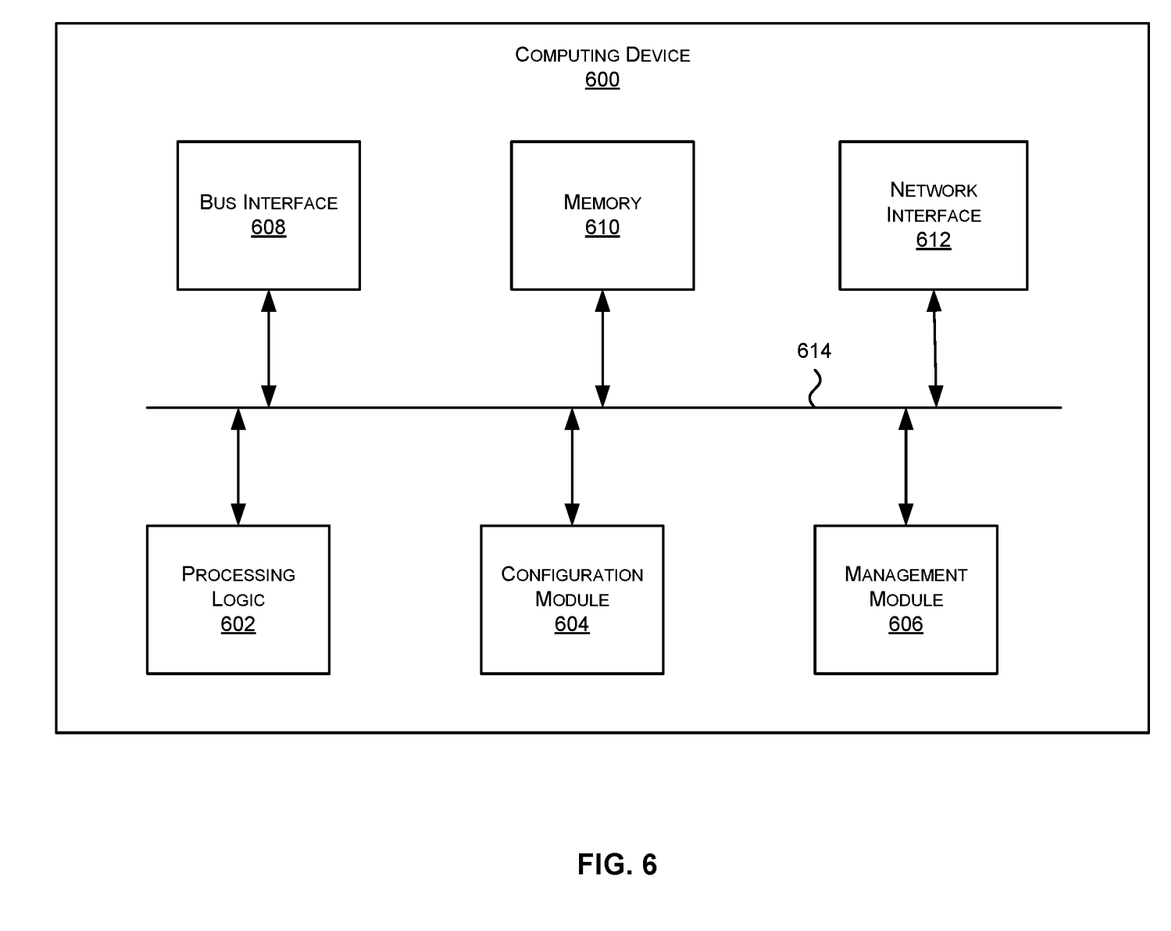
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. As an example, certain components or functionality of the computing device 600 can be part of the first SoC 102, or the second SoC 104. The computing device 600 may facilitate processing of packets and/or forwarding of packets from the computing device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 600 may be the recipient and/or generator of packets. In some implementations, the computing device 600 may modify the contents of the packet before forwarding the packet to another device. The computing device 600 may be a peripheral device coupled to another computer device, a switch, a router or any other suitable device enabled for receiving and forwarding packets.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, which are not illustrated here. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. $$$, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A multi-chip system comprising:
a first system-on-a-chip (SoC) comprising a first processor and a first memory coupled to a first interconnect; and
a second SoC comprising a second processor and a second memory coupled to a second interconnect, the second interconnect coupled to the first interconnect via a physical channel configured to support a plurality of virtual channels for communication between the first SoC and the second SoC,
wherein the first SoC is configured to:
receive, by the first interconnect, a first transaction from the first processor to access a Peripheral Component Interconnect express (PCIe) device on the second SoC;
receive, by the first interconnect, a second transaction from an input/output (I/O) device on the first SoC to access the second memory;
determine that the first transaction is associated with a PCIe traffic type;
determine that the second transaction is associated with a non-PCIe traffic type; and
communicate to the second SoC the first transaction over a first virtual channel corresponding to the PCIe traffic type and the second transaction over a second virtual channel corresponding to the non-PCIe traffic type, wherein traffic flow on each of the first virtual channel and the second virtual channel is managed independently, and
wherein the first SoC is further configured to:
receive an indication from the second SoC to halt transactions associated with the PCIe traffic type; and
upon receiving the indication, halt the traffic flow on the first virtual channel while continuing the traffic flow on the second virtual channel.

2. The multi-chip system of claim 1, wherein a traffic type of a transaction is determined based on an address of the PCIe device, or based on a transaction type associated with the transaction.

3. The multi-chip system of claim 1, wherein the physical channel is a non-coherent communication channel.

4. A first integrated circuit (IC), configured to:
identify transactions that are targeted to a second IC coupled to the first IC via a physical channel, the physical channel configured to support a plurality of virtual channels for communication between the first IC and the second IC;
determine a traffic type associated with each transaction from a plurality of traffic types, each traffic type assigned to a respective virtual channel from the plurality of virtual channels; and
communicate, via the physical channel, each transaction targeted to the second IC on a virtual channel corresponding to the traffic type associated with the transaction,
wherein the first IC is further configured to halt traffic on a first virtual channel of the plurality of virtual channels without interrupting traffic on other virtual channels.

5. The first IC of claim 4, wherein the first IC is further configured to restart the traffic on the first virtual channel without interrupting the traffic on the other virtual channels.

6. The first IC of claim 4, wherein the physical channel is a coherent communication channel.

7. The first IC of claim 4, wherein the physical channel is a non-coherent communication channel.

8. The first IC of claim 4, wherein the plurality of traffic types includes a Peripheral Component Interconnect express (PCIe) traffic type and a non-PCIe traffic type.

9. The first IC of claim 4, wherein the traffic type is determined based on information associated with the transaction.

10. The first IC of claim 4, wherein traffic flow on each virtual channel from the plurality of virtual channels is managed independently using a respective buffer on both the first IC and the second IC.

11. The first IC of claim 10, wherein the traffic flow on each virtual channel is managed independently by maintaining separate credits for each virtual channel.

12. The first IC of claim 4, wherein the transactions are based on an Advanced eXtensible Interface (AXI) protocol.

13. The first IC of claim 12, wherein the traffic type associated with each transaction is indicated in one or more AXI USER bits.

14. A computer-implemented method performed by a first system-on-a-chip (SoC), comprising:
identifying a first transaction and a second transaction that are targeted to a second SoC coupled to the first SoC via a physical channel, the physical channel configured to support a plurality of virtual channels for communication between the first SoC and the second SoC;
determining that the first transaction is associated with a first traffic type from a plurality of traffic types and the second transaction is associated with a second traffic type from the plurality of traffic types, wherein the first traffic type is assigned to a first virtual channel from the plurality of virtual channels, and the second traffic type is assigned to a second virtual channel from the plurality of virtual channels;
communicating, via the physical channel, the first transaction targeted to the second SoC on the first virtual channel corresponding to the first traffic type, and the second transaction targeted to the second SoC on the second virtual channel corresponding to the second traffic type;
receiving an indication from the second SoC to halt the first transaction associated with the first traffic type; and
halting traffic on a first virtual channel of the plurality of virtual channels without interrupting traffic on other virtual channels.

15. The computer-implemented method of claim 14, further comprising:
receiving another indication from the second SoC to restart the first transaction associated with the first traffic type; and
restarting the traffic on the first virtual channel without interrupting the traffic on the second virtual channel.

16. The computer-implemented method of claim 14, wherein communicating the first transaction includes sending a virtual channel identifier (VCID) corresponding to the first traffic type to the second SoC on the first virtual channel, and communicating the second transaction includes sending a VCID corresponding the second traffic type to the second SoC on the second virtual channel.

17. The computer-implemented method of claim 14, further comprising:
    managing traffic flow on the first virtual channel using a first buffer associated with the first traffic type, and managing traffic flow on the second virtual channel using a second buffer associated with the second traffic type.

\* \* \* \* \*